US012636814B1

(12) United States Patent
Kuznetcov et al.

(10) Patent No.: US 12,636,814 B1
(45) Date of Patent: May 26, 2026

(54) METHOD FOR MANUFACTURING A BUILDING COMPONENT WITH A CONCRETE LAYER AND MESH FORMWORK, AND A BUILDING COMPONENT WITH A CONCRETE LAYER AND MESH FORMWORK

(71) Applicant: ADDRESS ROBOTICS LIMITED, UK, London (GB)

(72) Inventors: Kirill Kuznetcov, Belgrade (RS); Mikhail Likhanov, Belgrade (RS); Rodion Shishkov, London (GB)

(73) Assignee: ADDRESS ROBOTICS LIMITED, UK, London (GB)

( * ) Notice: Subject to any disclaimer, the term of this patent is extended or adjusted under 35 U.S.C. 154(b) by 0 days.

(21) Appl. No.: 19/060,749

(22) Filed: Feb. 23, 2025

(51) Int. Cl.
*B28B 23/02* (2006.01)
*B28B 1/14* (2006.01)
(Continued)

(52) U.S. Cl.
CPC .............. *B28B 23/022* (2013.01); *B28B 1/14* (2013.01); *B28B 1/16* (2013.01); *E04B 1/16* (2013.01); *E04B 1/162* (2013.01); *E04B 1/167* (2013.01)

(58) Field of Classification Search
CPC ................. C04B 2111/27; C04B 41/52; C04B 2111/00293; C04B 2111/00508;
(Continued)

(56) References Cited

U.S. PATENT DOCUMENTS 2,251,499 A * 8/1941 Pelton ........................ E04B 2/86 249/35
3,362,121 A * 1/1968 Weber ........................ E04B 5/29 52/378
(Continued)

FOREIGN PATENT DOCUMENTS

CN 115419201 A * 12/2022 ............... E04C 5/04
EP 4442930 A1 * 10/2024 ........... E04B 1/6807

OTHER PUBLICATIONS

Machine English translation of Sager (EP-4442930-A1) (Year: 2024).*
(Continued)

*Primary Examiner* — Jeffrey M Wollschlager
*Assistant Examiner* — Edgaredmanuel Troche
(74) *Attorney, Agent, or Firm* — ASLAN LAW, P.C.

(57) ABSTRACT

The proposed invention can be applied in construction for the creation of building components with a concrete layer. Unlike traditional concrete building component manufacturing, the proposed method eliminates the need for removable formwork, reduces labor costs, and enables the production of complex geometries efficiently. A method for creating a building component with a concrete layer comprises applying at least one layer of waterproofing material to the base; installing permanent formwork on the base; threading at least one reinforcement bar through the formwork; pouring concrete mixture into the internal space enclosed by the formwork; curing concrete mixture until it reaches the required strength. The invention also discloses a building component produced by the proposed methods.

13 Claims, 3 Drawing Sheets

(51) Int. Cl.
*B28B 1/16* (2006.01)
*E04B 1/16* (2006.01)

(58) Field of Classification Search
CPC ... B32B 2307/7265; B32B 7/12; B32B 33/00; B32B 7/04; B32B 9/04; E01C 3/06; E01C 15/00; E01C 7/325; E01C 23/0973; E01C 7/14; E01C 11/04; E01C 11/16; E04C 2/288; E04C 5/0636; E04C 2/044; E04C 5/168; E04C 5/01; E04C 5/06; E04C 5/07; E04C 5/12; E04C 5/125; E04C 5/16; E04C 5/162; E04C 5/167; E04C 5/18; E04C 3/20; B28B 11/04; B28B 23/02; B28B 23/04; B28B 7/14; B28B 7/24; B28B 23/00; B28B 23/022; B28B 23/024; B28B 23/026; B28B 23/0006; B28B 23/0062; B28B 23/0081; B28B 23/028; B28B 23/046; B28B 23/16; B28B 1/14; B28B 1/16; B28B 7/0017; B28B 7/0014; B28B 7/0026; B28B 2007/005; B28B 2007/0052; B28B 7/0029; B28B 7/22; B28B 1/50; B28B 1/26; D06N 2209/128; Y10S 264/57; Y10S 425/029; Y10T 428/2438; Y10T 428/2835; Y10T 428/2848; E04B 1/16; E04B 2103/02; E04B 9/04; E04B 2/86; E04B 1/345; E04B 2001/327; E04B 1/166; E04B 1/19; E04G 17/065; E04G 17/0658; E04G 17/0742; E04G 11/062; E04G 9/065; E04G 21/142; E04G 21/185; B29C 33/307
USPC ....... 52/537, 676, 649.1, 684; 264/268, 505; 249/35; 425/29, 470
See application file for complete search history.

(56) References Cited

U.S. PATENT DOCUMENTS

| | | | | |
|---|---|---|---|---|
| 3,512,330 A * | 5/1970 | Shlesinger | E04C 5/18 | 52/687 |
| 3,785,914 A * | 1/1974 | King | B32B 3/12 | 428/184 |
| 4,945,704 A * | 8/1990 | Brown, Jr. | E04C 5/20 | 52/707 |
| 6,354,054 B1 * | 3/2002 | Verelli | E04C 5/168 | 248/440 |
| 6,363,679 B1 * | 4/2002 | Rutherford | E04C 5/20 | 52/681 |
| 8,122,673 B2 * | 2/2012 | Ellis | E04D 13/0335 | 52/645 |
| 11,634,909 B2 * | 4/2023 | Cramer | E04C 5/206 | 52/684 |
| 2004/0231276 A1 * | 11/2004 | Patrick | E04B 5/40 | 52/634 |
| 2005/0034418 A1 * | 2/2005 | Bravinski | E04B 5/48 | 52/782.1 |
| 2007/0101669 A1 * | 5/2007 | Jessen | E04H 4/141 | 52/223.13 |
| 2008/0178554 A1 * | 7/2008 | McKay | E04C 5/20 | 52/309.1 |
| 2010/0251657 A1 * | 10/2010 | Richardson | E04B 2/86 | 52/745.21 |
| 2013/0014458 A1 * | 1/2013 | Boydstun, IV | E04G 9/065 | 52/741.11 |
| 2014/0115995 A1 * | 5/2014 | Baldoni | E04C 5/168 | 52/687 |
| 2016/0207220 A1 * | 7/2016 | Hack | B28B 23/02 | |
| 2020/0040580 A1 * | 2/2020 | Kim | E04B 5/32 | |
| 2020/0208002 A1 * | 7/2020 | Guo | C09D 183/06 | |
| 2020/0240139 A1 * | 7/2020 | Smith | E04C 2/322 | |

OTHER PUBLICATIONS

Machine English translation of Wang (CN-115419201-A) (Year: 2022).*

* cited by examiner

METHOD FOR MANUFACTURING A BUILDING COMPONENT WITH A CONCRETE LAYER AND MESH FORMWORK, AND A BUILDING COMPONENT WITH A CONCRETE LAYER AND MESH FORMWORK

FIELD OF APPLICATION

The proposed invention can be applied in construction to create building components with a concrete layer, which will be used for erecting residential, commercial, and industrial buildings, including load-bearing walls, inter-floor slabs, facade panels, and decorative finishing elements.

The invention can be used in monolithic construction, for decorative and functional facade elements, for floors, columns, and walls with non-standard shapes, in construction using wooden panels (e.g., CLT and GLT), and in prefabricated structures with rapid assembly. The proposed building components can be adapted for use in seismic zones, high-load applications, or extreme weather conditions by adjusting the reinforcement density and material composition.

The invention is applicable for the manufacturing of building components for any construction methods involving the assembly of objects from pre-manufactured elements, such as prefabrication, modular construction, panelized construction, and other similar techniques.

Such pre-manufactured elements may include structural components (e.g., walls, columns, slabs) as well as large modules (e.g., entire rooms, sections of floors). Throughout this description, these pre-manufactured elements are collectively referred to as building components or just components.

PRIOR ART

Various methods for manufacturing building components with a concrete layer and reinforcement are known in construction. Conventional concrete building components production, for example such as panels, typically involves using removable formwork to shape the concrete layer, followed by a curing process. These methods, while effective, present several challenges related to time-consuming formwork removal, increased labor costs, and limited flexibility in forming complex geometries.

Precast concrete panels are manufactured in industrial conditions using rigid formwork, which is later removed after the concrete has cured. While these methods ensure high structural strength, they lack flexibility in customization and often require additional reinforcement anchoring during assembly.

Some methods utilize permanent formwork, often made of fiber-reinforced polymer, metal, or cementitious boards, to eliminate the need for formwork removal. However, these solutions often require complex fastening systems and do not provide sufficient integration with reinforcement.

Existing mesh-reinforced concrete applications, such as ferrocement, involve fine wire mesh embedded within a thin layer of cement. However, these techniques do not provide adequate structural strength for large load-bearing elements and often require manual application of concrete, leading to inconsistencies in quality.

SUMMARY OF THE INVENTION

This invention describes a method for creating building components, for example composite construction panels, in which one of the layers is made of a concrete mixture, and a building component created applying the method. During the formation of the concrete layer, permanent formwork is used. The permanent formwork does not need to be removed after pouring the concrete mixture and becomes an integral part of the final product after the concrete mixture hardens. Hereinafter, such permanent formwork will be referred to as formwork.

A method for manufacturing a building component comprises: applying at least one layer of waterproofing material to the base; installing permanent formwork on the base, wherein the formwork is made of wave-shaped segments, wherein each formwork segment has at least three mesh layers, with the mesh openings in the inner layer being smaller than the mesh openings in the outer layers; placing reinforcement into the formwork; threading at least one reinforcement bar through the formwork, wherein the reinforcement bar passes through an opening in at least one outer layer of the formwork; pouring concrete mixture into the internal space enclosed by the formwork; curing the concrete mixture until it reaches the required strength.

A method for manufacturing a building component comprises: applying at least one layer of waterproofing material to the base; installing permanent formwork on the base, wherein the formwork is made of wave-shaped segments and each formwork segment has at least three mesh layers, with the mesh openings in the inner layer being smaller than the mesh openings in the outer layers; placing reinforcement into the formwork, wherein the reinforcement is placed on at least one support element and attached to the base by fixing at least one clamping bracket over the reinforcement, wherein the clamping bracket is secured to the base using at least one fastener; threading at least one reinforcement bar through the formwork, wherein the reinforcement bar passes through an opening in at least one outer layer of the formwork and is attached to the reinforcement inside the space enclosed by the formwork; pouring concrete mixture into the internal space enclosed by the formwork; curing the concrete mixture until it reaches the required strength.

A building component comprises: a base made of wooden, composite, or metal material; a waterproofing layer on the surface of the base; a formwork made of wave-shaped segments, wherein each formwork segment has at least three mesh layers, with the mesh openings in the inner layer being smaller than the mesh openings in the outer layers; reinforcement placed within the concrete layer; at least one reinforcement bar that passes through an opening in at least one outer layer of the formwork; a concrete layer applied to the surface of the base.

DETAILED DESCRIPTION OF THE INVENTION

Building component with a concrete layer consist of a base, a concrete mixture layer, and reinforcement placed within the concrete layer. To produce such building components, the concrete mixture must be placed on the base in such a way that it is fixed relative to the base.

Typically, the concrete mixture is applied to the base in a liquid form, so that it evenly covers the base; in this case, it is required that the concrete mixture not flow beyond the edges of the base and retain the required shape until it hardens.

A metal, plastic, wooden, or composite object with at least one flat side, for example a panel, can be used as the base, including one made of multiple layers of solid lumber glued together. For example, the base could be a CLT (cross-laminated timber) panel or a GLT (Glued-Laminated Timber) panel.

In some embodiments, during subsequent steps, the base is placed on a horizontal surface.

Step 001: Application of a Waterproofing Layer

Figure 1:
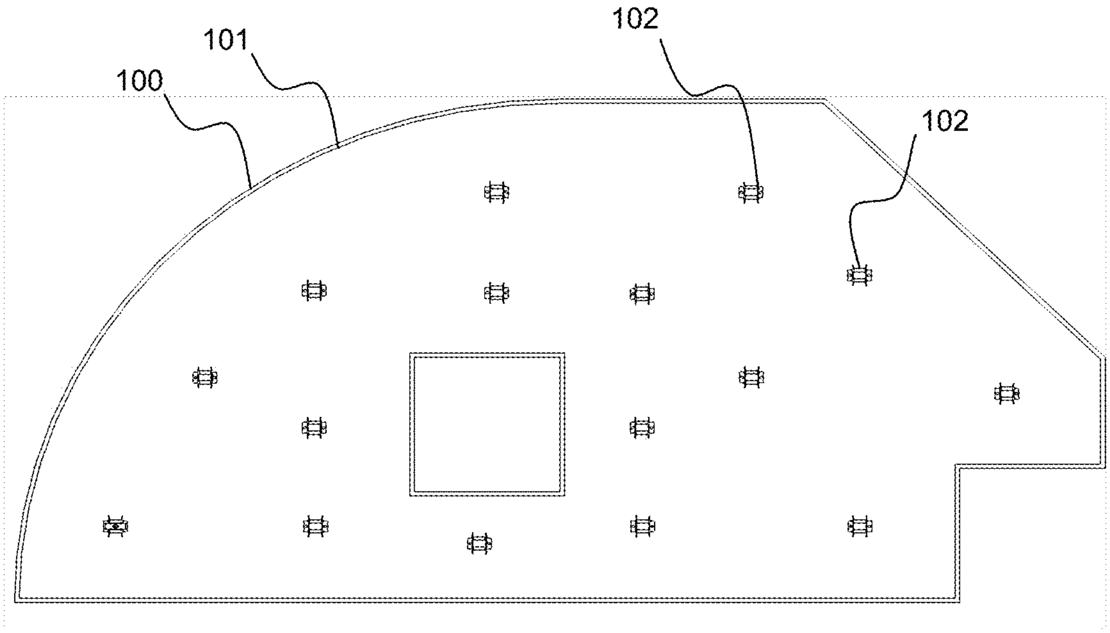
FIG. 1—A base (100) with an applied waterproofing layer (101) and support elements (102) placed on the base, preparing the surface for subsequent construction steps.

A waterproofing layer is applied to the surface of the base to protect the material from moisture as shown on the FIG. 1.

If a waterproofing layer is not applied, this may lead to wood swelling, base deformation, loss of strength, and cracking. Such changes can disrupt adhesion between layers, resulting in the delamination of the concrete coating and a reduction in the durability of the structure.

In some embodiments, the waterproofing layer can be applied using a brush, roller, or spray can.

In some embodiments, liquid sealants, waterproof paints, or other specialized coatings may be used.

In some embodiments, bituminous mastics or membrane coatings providing enhanced water resistance may be used for waterproofing.

In some embodiments, a base with a pre-applied waterproofing layer may be used.

In some embodiments, the adhesion of the concrete layer to the base can be enhanced by additional methods, such as: applying adhesion primers (e.g., epoxy or polyurethane) before placing the concrete, using a roughened surface on the base (e.g., creating grooves on a wooden or composite panel), introducing fiber reinforcement into the concrete mixture to improve bonding with the base.

Further steps are carried out on the side of the base where the waterproofing layer has been applied.

Step 002: Installation of the Formwork

Figure 2:
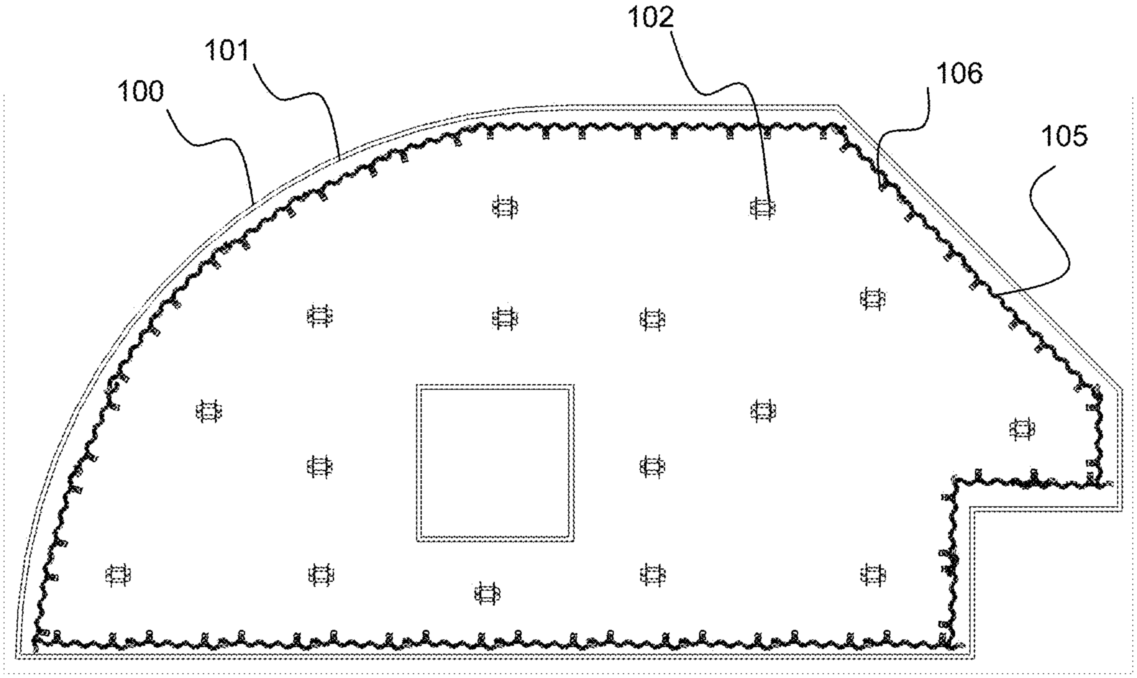
FIG. 2—The base (100) with the applied waterproofing layer (101) and support elements (102), with formwork (105) installed and secured to the base using brackets (106).
Figure 3:
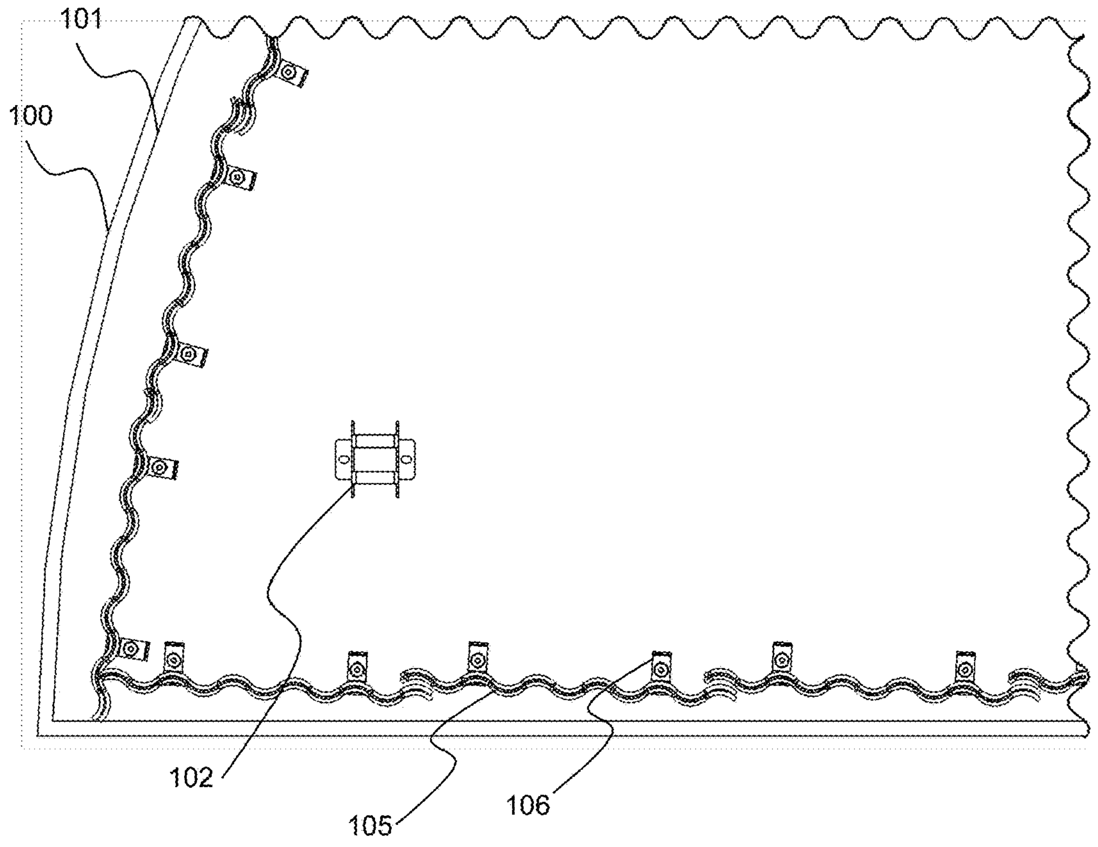
FIG. 3—A magnified section of the base (100) from FIG. 2, detailing the arrangement of the formwork (105), brackets (106), and support elements (102).
Figure 4:
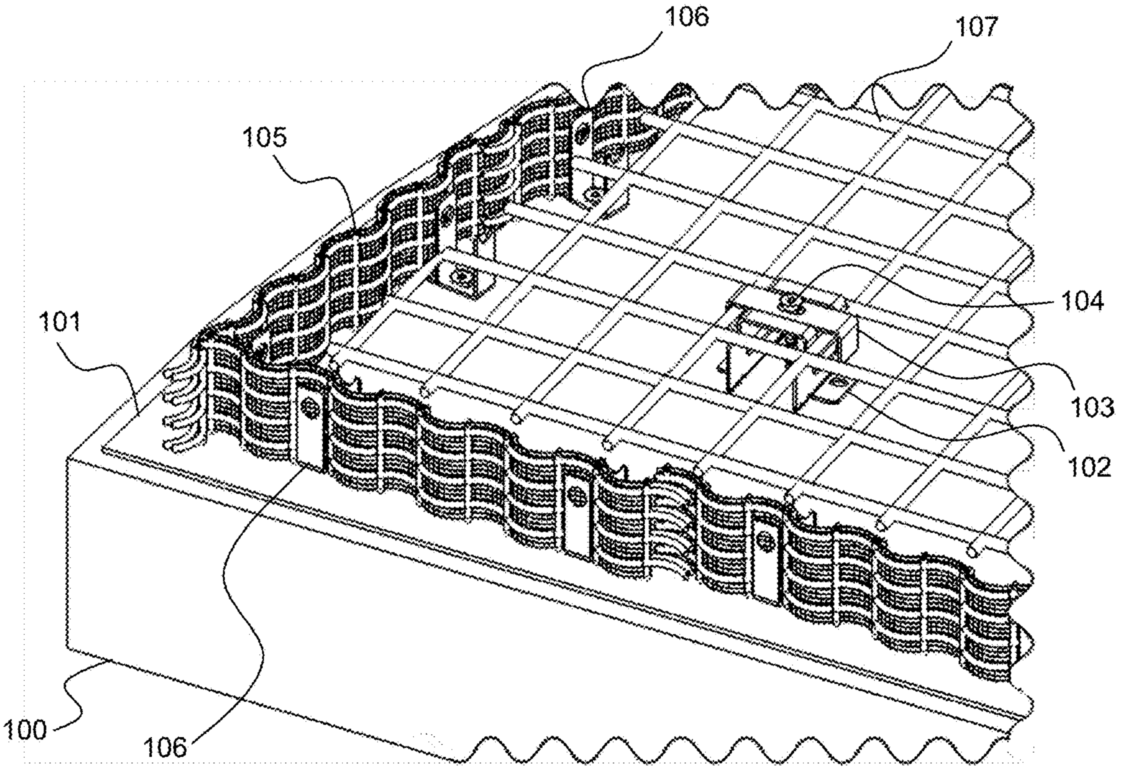
FIG. 4—A detailed view of the base (100) with the applied waterproofing layer (101), support element (102), and formwork (105) secured with brackets (106). Additionally, it illustrates reinforcement (107) positioned on the support element (102) and secured to the base using a clamping bracket (103) and at least one fastener (104).
Figure 5:
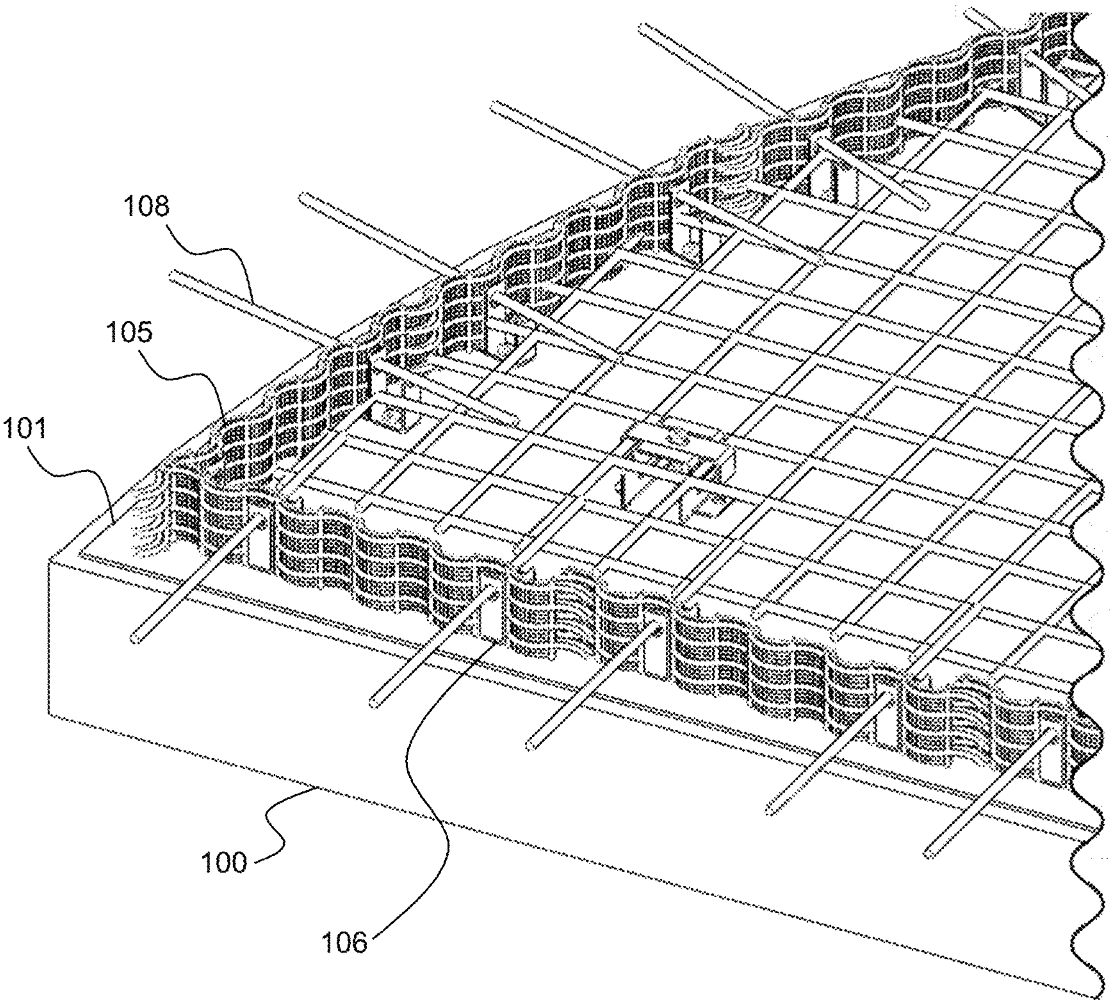
FIG. 5—A depiction of reinforcement bars (108) extending through the formwork (105), demonstrating the integration of reinforcement into the building component's structure.

Formwork is installed along the edge of the base to contain the concrete pour and shape the external contour of the slab as shown on the FIG. 2.

The present invention introduces a wave-shaped mesh formwork with multiple layers, designed to: eliminate removable formwork by integrating a multi-layered mesh structure that becomes part of the final building component; facilitate reinforcement integration by enabling reinforcement bars to pass through the outer formwork layers, ensuring structural cohesion; support complex geometries using flexible, wave-shaped formwork segments, allowing the formation of curved and customized building component shapes; prevent concrete seepage by using fine-mesh inner layers, effectively containing the concrete mixture while maintaining structural integrity. Compared to traditional rigid or fiber-reinforced polymer formworks, the wave-shaped mesh formwork offers enhanced adaptability to irregular geometries, reducing material waste and improving efficiency in complex architectural designs.

The formwork consists of three layers: two outer layers, preferably made of coarse-mesh material, and an inner layer, preferably made of fine-mesh material, placed between them. The mesh openings in the outer layers are larger than those in the inner layer. This approach allows to balance strength and flexibility, reducing material waste and ensuring efficient use of resources.

In some embodiments, the mesh openings in the outer layers are at least twice the size of those in the inner layer.

In some embodiments, both outer layers may be made from the same coarse-mesh material.

In some embodiments, the outer layers may be made from different types of mesh.

The outer layers of the formwork are designed to maintain the shape and position of the inner formwork layer. The outer mesh layers serve as the primary structural framework, maintaining the wave shape and ensuring reinforcement bars pass through without obstruction. These layers must be strong, rigid, and durable, preventing deformation while providing load distribution and mechanical stability.

In some embodiments, the mesh openings in the outer formwork layers are large enough to allow reinforcement bars to pass through without damaging the outer layers.

In some embodiments, the mesh for the outer layers is selected so that its mesh openings are larger than the diameter of the reinforcement bars, ensuring that the formwork retains its shape and properly secures the reinforcement.

In some embodiments, at least one of the outer formwork layers can be made from coarse-mesh metal, polymer, or other materials. In some cases, metal mesh is preferred due to its greater rigidity and ability to maintain form.

In some embodiments, at least one of the outer formwork layers is made of the material, chosen from the following: galvanized steel mesh, that provides high mechanical strength and corrosion resistance, ensures rigidity to maintain wave shape under concrete load; stainless steel mesh, that has superior corrosion resistance, ideal for high-humidity or chemically aggressive environments, provides long-term durability without additional coatings; polymer-coated steel mesh, that reduces rebar friction and prevents premature wear and is lightweight; fiberglass-reinforced polymer mesh, that is non-metallic, corrosion-resistant, and electrically non-conductive, suitable for applications where weight reduction and chemical resistance are critical.

The inner mesh layer is designed to serve as a barrier to prevent concrete seepage while allowing controlled moisture and air release during curing. This layer must be fine enough to retain concrete yet permeable enough to enable proper setting. It acts as a barrier, holding the liquid concrete in place until it fully or partially hardens, which is particularly important when vibration is used for mixture compaction. The fine mesh ensures strong adhesion between the concrete and reinforcement while maintaining a uniform concrete surface without excessive material loss. The inner mesh layer is permeable, it ensures proper curing by allowing air and excess water to escape, resulting in a denser and more durable concrete surface.

In some embodiments, the inner formwork layer may be made from fine-mesh materials, such as metal or polymer mesh, or other known materials. Metal or polymer mesh is preferred as it can fit more tightly against the reinforcement bars that pierce the inner mesh.

In some embodiments, the inner formwork layer is made of the material, chosen from the following: fine galvanized steel mesh, that ensures high strength and rigidity while preventing corrosion over time, supports strong adhesion between reinforcement and the concrete layer; fiberglass mesh, that is lightweight, non-corrosive, and easy to shape for complex geometries, maintains structural flexibility while preventing concrete bleeding; polymer-coated fine mesh, that is chemically resistant and prevents moisture retention, reducing curing time, enhances durability in aggressive environments (e.g., marine applications); nano-coated metal mesh, that integrates water-repellent and anti-corrosion properties, provides self-cleaning capabilities, preventing cement buildup during automation.

In some embodiments, the mesh openings in the inner formwork layer are small enough to prevent the flow of liquid or semi-hardened concrete through the mesh.

For example, the outer mesh layers may have mesh opening size: 25-50 mm; wire diameter: 1.5-3 mm (14-16 gauge steel or equivalent composite material); material: galvanized steel, stainless steel, or polymer-coated composite mesh. It will provide rigidity to maintain the wave-shaped form, allow reinforcement bars (8-16 mm in diameter) to pass through, and ensure stability during concrete pouring.

For example, the inner mesh layer may have mesh opening size: 5-15 mm; wire diameter: 0.8-1.5 mm (18-20 gauge steel or equivalent composite material); material: fine steel mesh, fiberglass, or polymer-based mesh with corrosion-resistant coating. It will prevent concrete seepage while allowing controlled permeability for air and excess water escape during curing.

Brackets (106) are positioned along the perimeter of the base and serve as anchoring elements for the wave-shaped mesh formwork. This ensures that the formwork remains accurately aligned and rigidly secured during concrete pouring and curing. In contrast, prior art methods, such as conventional ferrocement panels, rely on manual stabilization techniques that introduce inconsistencies and misalignment. The use of brackets eliminates such variations, leading to greater uniformity in building component production.

In some embodiments, the brackets (106) are angle brackets, U-shaped fasteners, or other profiled fastening components.

The brackets (106) in the proposed invention secure the formwork permanently, allowing it to remain as part of the final structure. This eliminates the need for manual removal, reducing construction time and minimizing material costs. Additionally, the brackets allow pre-fabrication of mesh sections with pre-installed reinforcement, enabling automated or semi-automated production lines to assemble the building component with high precision. Brackets (106) also contribute to crack prevention and durability by ensuring that the reinforcement is properly positioned within the optimal stress zones of the concrete layer. This improves bonding between the reinforcement and the concrete, reducing the risk of delamination or weak points in the final structure.

Brackets (106) are fastened to the base with at least one fastener through at least one hole in the bracket.

In some embodiments, fasteners may include self-tapping screws, anchor bolts, wedge anchors, dowel nails, or other fastening elements that ensure reliable fixation of the reinforcement relative to the base.

In some embodiments, holes for the fasteners may be pre-drilled in the base or created at the moment of fixation, such as when driving a self-tapping screw into the base.

In some embodiments, brackets (106) have at least one horizontal section, which is attached to the base and positioned parallel to its surface, and at least one vertical section, connected to the horizontal section and positioned perpendicular to it. In this case, the formwork is attached to the vertical section. The attachment can be achieved using fasteners or flexible fastening elements such as wire, zip ties, polymer straps, or other means.

In some embodiments, brackets (106) have a horizontal section attached to the base and two parallel vertical sections, positioned perpendicular to the horizontal section. In this case, the formwork is placed between these two parallel vertical sections.

In some embodiments, brackets (106) have at least one hole.

In some embodiments, brackets (106) may have at least two holes: one for fastening the bracket (106) to the base with a fastener, and the other for the passage of at least one reinforcement bar (108).

In some embodiments, brackets (106) have at least one protruding section with a recess at its end, designed to hold at least one reinforcement bar (108). This recess prevents the reinforcement bar from rolling off the protruding section of the bracket (106) before it is secured.

In some embodiments, brackets (106) are installed in two rows, ensuring that there is enough space between the protruding parts above the base surface to accommodate the formwork.

In some embodiments, brackets (106) may be installed in one or two rows, allowing space for the inner formwork layer to be positioned between the protruding parts.

The materials for the outer and inner layers of the formwork are cut into elongated strips.

In some embodiments, the strip width of the materials used for the inner and outer formwork layers is the same.

In some embodiments, the cut materials are stacked sequentially, ensuring that the material forming the inner formwork layer is positioned between the materials forming the outer formwork layers.

In some embodiments, the strip of material for the outer formwork layer is selected to be at least twice as wide as the strip of material for the inner formwork layer.

In some embodiments, the material for the outer formwork layer is bent along its long edge to form a U-shaped or Π-shaped profile.

The formwork is assembled from segments, which are connected to form a continuous contour.

In some embodiments, the materials for the inner and outer formwork layers are cut into segments of the required size. The materials are arranged before or after cutting to ensure they follow the correct sequence: the inner formwork layer is positioned between the material(s) forming the outer formwork layers. As a result, each formwork segment consists of an outer layer, an inner layer, and another outer layer in succession.

In some embodiments, the inner and outer formwork layers are cut into segments of 10-20 cm in length, allowing for the creation of flexible formwork shapes. The shorter the segment, the greater the variety of formwork geometries that can be formed.

In some embodiments, the outer layers of each segment are made from a single mesh sheet. In this case, the mesh segment for the outer layers of one formwork segment is chosen to be twice the area of the material forming the inner layer. The outer layer material is then folded in half, and the inner layer material is placed between the two folded sections.

In some embodiments, each formwork segment is bent into a wave shape, such as a regular sine wave. The bending can be performed using manual tools or machines, such as a robotic manipulator.

Using these wave-shaped segments, a variety of formwork geometries can be assembled, including curved corners, wavy surfaces, and other non-linear elements, without needing to modify or cut the segments further. The wave-shaped design allows for pre-fabrication and easy onsite assembly, significantly reducing construction time while maintaining precise building component alignment. The wave-shaped design of the mesh formwork provides superior load distribution and resistance to deformation, leading to improved structural performance compared to flat ferrocement panels. The wave-shaped design enhances adhesion between the formwork and concrete, reducing detachment risks.

The wave-shaped mesh formwork in the invention consists of curved segments that form a continuous undulating structure. This configuration provides enhanced structural integrity, improved load distribution, and superior adhesion between the concrete and reinforcement.

In some embodiments, overlapping joints are used at the bend points of consecutive formwork segments, allowing each segment to be placed at an angle relative to the previous one. Thanks to the wave-shaped design, these segments can be arranged at different angles to each other, creating complex shapes such as rounded corners, wavy surfaces, or curved elements.

This approach allows for the use of standardized elements to form various geometries without the need to manufacture unique formwork segments for each composite building component shape. This system is particularly beneficial for producing non-standard building components, such as decorative façade elements, barriers, or slabs with complex geometries.

In some embodiments, the curved segments of the inner and outer formwork layers are pre-formed before placing them on the base and assembling the formwork.

In some embodiments, fine-mesh segments intended for the inner formwork layer are placed along the long edge of each segment, perpendicular to the base and flush against the brackets (106). If two rows of brackets are used, the inner formwork segments are positioned between the perpendicular protrusions of the brackets. The outer formwork layers are then placed over the inner formwork layer and brackets (106), ensuring that the fold line of the outer layers is on top and that the inner formwork layer and brackets (106) are enclosed within the outer formwork.

In some embodiments, the curved segments have wave amplitude (A): 5-200 mm. This is the vertical height from the lowest to the highest point of the wave. A larger amplitude allows for greater flexibility in forming curved or complex building component geometries.

Amplitude preferably should not be less than 5 mm because a smaller curvature would make the formwork effectively flat, losing the structural benefits of the wave shape. A very small wave profile would not sufficiently interlock with the concrete, reducing adhesion and increasing the risk of delamination.

Amplitude preferably should not exceed 200 mm because a larger wave height would create excessive voids within the formwork, requiring a significantly larger volume of concrete to fill the spaces. This could lead to weaker adhesion between the reinforcement and concrete, increasing the risk of stress fractures in the final structure.

In some embodiments, the curved segments have wave wavelength (λ): 30-300 mm. This is the horizontal distance between two adjacent wave peaks. A shorter wavelength (30-100 mm) provides higher rigidity for structural load-bearing elements. A longer wavelength (100-300 mm) is suitable for flexible, aesthetic, or decorative building components.

Wavelength preferably should not be less than 30 mm because a shorter distance between peaks would create an excessively dense wave pattern, making the formwork too rigid to flexibly adapt to different shapes and difficult to manufacture using automated bending machines. Additionally, excessively small wavelengths could lead to concrete trapping and incomplete filling of the formwork during pouring.

Wavelength preferably should not exceed 300 mm because longer wave distances would make the formwork too flexible and structurally unstable, reducing its ability to properly contain the concrete mixture. A very large wavelength could also lead to inconsistent load distribution and weakened mechanical performance, especially in load-bearing applications.

In a preferred embodiment, the range of 5-100 mm for amplitude and 30-300 mm for wavelength is selected. Using those ranges ensures the most efficient material use without excessive concrete requirements; the best structural stability while maintaining adaptability for curved and complex geometries; easier manufacturability with CNC-controlled bending machines and robotic welding systems; optimal adhesion and bonding between reinforcement, concrete, and formwork.

In some embodiments, the curved segments have sine wave profile—for uniform stress distribution and optimized load transfer.

In some embodiments, the curved segments have triangular wave profile—for increased stiffness in high-load applications.

In some embodiments, the curved segments have asymmetrical wave profile—for curved elements with variable thickness in facade applications.

In some embodiments, during this stage or the previous stage, support elements (102) are placed on the base within the perimeter formed by the formwork. Support elements are used to create fixed attachment points for reinforcement and/or to position the reinforcement at a specific height above the base surface.

Support elements (102) may have various shapes, such as cylindrical, parallelepiped, inverted U-shape, or other geometries that allow for stable placement of reinforcement on the support element.

Support elements can be made of metal, plastic, composite material, wood, or other dense materials.

Step 003: Reinforcement Placement

The reinforcement is cut to a length that allows it to be placed within the contour formed by the formwork.

In some embodiments, the reinforcement is cut so that small gaps remain between its ends and the formwork, facilitating its placement inside the contour. In some embodiments, these gaps may range from 1 to 300 mm.

In some embodiments, the reinforcement is placed on support elements (102). A single support element may be used for one reinforcement rod, or multiple support elements may support a single reinforcement structure. If the reinforcement rods intersect, it is preferable to position the support element at the intersection points.

In some embodiments, the reinforcement is placed on the surface of the base.

The reinforcement increases the strength and rigidity of the concrete layer, prevents cracking, and ensures the connection between the concrete and wooden layers, improving the overall structural stability.

In some embodiments, the reinforcement may be in the form of individual rods or interconnected rods forming a reinforcement mesh.

In some embodiments, the reinforcement may be made of metal or composite rods, fiberglass, or other materials with similar properties. The material of the reinforcement rods, their thickness, and the spacing of the rods can be selected based on the structural strength requirements of the building component, the size and shape of the product, as well as the expected loads and operating conditions.

In some embodiments, the reinforcement is secured to the surface of the base or at a required height above the base using clamping brackets (103), such as staples, and fasteners. This provides additional fixation of the reinforcement relative to the base and ensures the strength of the final product.

In some embodiments, support elements (102) may be used to position the reinforcement at a specific height above the base surface. In this case, before placing the reinforcement above the base, the support elements are positioned on the base surface.

Prior art methods often result in reinforcement sagging due to insufficient support, leading to uneven stress distribution and reduced building component strength. By incorporating support elements (102) at pre-determined intervals, the invention ensures that reinforcement remains at the required elevation throughout the manufacturing process. Pre-defined support spacing prevents sagging, ensuring uniform concrete reinforcement interaction. Load-bearing efficiency is improved by ensuring reinforcement remains embedded within the structural zone of the building component.

Support elements may have various shapes, such as cylindrical, parallelepiped, inverted U-shape, or other forms that allow the reinforcement to be stably positioned on the support element. The support elements are placed in such a way as to ensure the reinforcement is positioned at a predetermined height above the base.

Support elements can be made of metal, plastic, composite material, wood, or other dense materials.

The building component may have one or multiple layers of reinforcement, but at least one layer must be present.

In some embodiments, when placing the second and subsequent layers of reinforcement, the support element may be positioned either between the base and the reinforcement layer being installed or between the previous reinforcement layer and the one being installed.

In some embodiments, the reinforcement rests on the support elements.

In some embodiments, the reinforcement is secured relative to the base by clamping brackets (103) placed over the support elements (102) and fastened with fasteners (104). The fasteners pass through both the support element and the clamping bracket and are anchored in the base, securing the reinforcement in place.

The integration of support elements (102), clamping brackets (103), and fasteners (104) in the proposed invention helps to improve reinforcement stability, structural integrity, and automation compatibility, while also reduces material waste and labor costs. The proposed system enables prefabrication of reinforcement assemblies, where support elements (102) and clamping brackets (103) are pre-installed before concrete pouring; robotic placement of reinforcement bars into secured brackets, reducing manual intervention; elimination of temporary fasteners and manual tie adjustments, significantly lowering assembly time. These advancements make the system highly compatible with automated manufacturing, ensuring consistent reinforcement positioning across large-scale production; standardized building component quality with minimized human error; faster construction cycles, reducing material waste and assembly costs.

In conventional construction methods, reinforcement is typically laid directly on the base or manually tied to formwork structures, which can result in misalignment and displacement during concrete pouring and curing. The proposed invention overcomes these issues by utilizing support elements (102) to elevate the reinforcement to an optimal height, ensuring proper concrete coverage and structural load distribution. Clamping brackets (103) secure the reinforcement onto the support element (102), preventing movement during vibration and pouring. Fasteners (104) anchor the assembly to the base, eliminating displacement caused by external forces or uneven curing. Fixed positioning ensures that reinforcement is placed within the optimal load-bearing zones of the building component, enhancing mechanical performance and long-term durability.

The combination of support elements (102), clamping brackets (103), and fasteners (104) improves the bonding of concrete with reinforcement, ensuring reinforcement remains fully embedded, preventing weak spots; proper load transfer between concrete and reinforcement, minimizing crack formation; optimal positioning in compression and tension zones, improving building component durability.

In some embodiments, holes for fasteners may be pre-made in the base before the reinforcement is secured.

Various fasteners, such as self-tapping screws, anchor bolts, wedge anchors, or expansion nails, may be used to ensure a reliable fixation of the reinforcement relative to the base.

Clamping brackets are preferably made of metal, as they need to be strong enough to provide secure fixation. However, other materials, such as polymers, may also be used.

In some embodiments, the support element (102) has a clamp body, which may be in the form of a rectangular formwork or a U-shaped body, along with legs, and includes at least one fixing hole. The fixing hole may be located on the clamp body, on the legs, or in both locations. In this case, the reinforcement rests on the clamp body, while the legs are positioned against the base. The support element can be fixed to the base through the fixing holes using at least one fastener to enhance the reliability of the reinforcement's attachment to the base.

In some embodiments, the clamping bracket (103) is larger than the support element and is placed over the support element and the reinforcement to secure at least one reinforcement rod between the support element and the clamping bracket.

In some embodiments, the clamp body of the support element has protruding sections on which the reinforcement rests. This design optimizes material usage for the production of the support element.

The clamping bracket has at least one fixing hole, through which it is secured to the base using at least one fastener (104).

In some embodiments, the clamping bracket may be fixed using: fasteners passing through designated holes in the clamping bracket and anchored into the base; screws or anchors that pass through the clamping bracket, securing it to the base.

A single fastening assembly, consisting of a support element, a clamping bracket, and a fastener, may be used for securing either a single reinforcement rod or multiple rods. If reinforcement rods intersect, it is preferable to place the fastening assembly at the intersection points.

Securing the reinforcement increases the accuracy and stability of its position within the concrete layer, enhancing the uniform distribution of loads and improving the strength of the slab structure.

The proposed technology also allows for the installation of pre-stressed reinforcement if required by the strength and rigidity calculations of the building component. Since the reinforcement is installed before the concrete is poured, this improves the structural performance, increases its load-bearing capacity, and reduces the risk of cracking by minimizing tensile stresses in the concrete after it hardens.

The method for installing pre-stressed reinforcement involves several sequential steps to create initial tension in the reinforcement elements before pouring the concrete layer.

First, the ends of the reinforcement are fixed to the building component base to prevent displacement during tensioning. To secure the tensioned reinforcement in a wooden or composite base, the following methods may be used: anchor plates or steel studs pre-installed in the base (e.g., glued with epoxy resin); special embedded metal inserts with holes for anchor clamps; for high-load applications, welded nodes connected to metallic inclusions in the building component, creating a reliable support point for a jack or other tensioning mechanism; after securing the reinforcement ends, its central section is gripped by a robotic manipulator equipped with a gripper that pulls the reinforcement to a specified distance or force level.

Tensioning can be performed using various devices, including hydraulic tension jacks, electromechanical screw systems, or pneumatic tensioners, ensuring smooth regulation of tension. A control system monitors the force and elongation of the reinforcement during tensioning, ensuring precise compliance with design calculations.

Once tensioned, the reinforcement elements are fixed to the base using: hydraulic locking mechanisms, mechanical stops with automatic locking, or special clamps that stabilize the reinforcement and prevent it from relaxing before the concrete mix fully sets.

Tensioning may be performed in any plane depending on the strength calculations and building component purpose, including: horizontal tensioning for floor slabs, vertical tensioning for wall panels, diagonal tensioning for structures with combined loads.

This method can be implemented in automated assembly lines, where tensioning is performed by a robotic system with a hydraulic manipulator and force control sensors, as well as in stationary setups using hydraulic jacks with mechanical clamps.

An alternative approach involves a mobile robotic tensioner with an electromechanical drive, moving along the building component and tensioning the reinforcement sequentially in each segment, which is particularly effective for prefabricated structures of various sizes.

Since the reinforcement can be positioned in any orientation before concrete pouring, this allows for adjusting the reinforcement angles according to load requirements. Additionally, multiple levels of reinforcement can be used, increasing the building component's overall strength.

Step 004: Installation of Reinforcement Bars (108)

During construction, reinforcement bars (108) protruding beyond the concrete layer may be required for securing the building component. These reinforcement bars facilitate the connection of adjacent building components, ensuring structural integrity.

In some cases, reinforcement bars (108) should protrude from at least two adjacent sides of the building component.

Protruding reinforcement bars are particularly important when using wooden building component, for example panels or columns, in construction. When concrete is poured, the reinforcement becomes an integrated part of the structure, forming a strong monolithic bond. The protruding elements provide resistance to displacement, especially under dynamic loads, such as vibrations or seismic activity.

Reinforcement bars (108) serve as attachment points for connecting with other structural elements, such as walls, partitions, or beams. The protruding sections can be welded or tied with wire to other reinforcement bars.

The presence of protruding reinforcement bars allows structural adaptation to changing installation conditions or design modifications. These bars can be used as embedded elements for the subsequent attachment of additional reinforcement layers or fastening components.

Reinforcement bars (108) can function as anchor fasteners, particularly in building components subject to tensile or displacement forces. This is especially useful in harsh climatic or mechanical conditions.

In some embodiments, reinforcement bars (108) are solid metal rods, with their quantity determined by the specific structural requirements.

Each reinforcement bar (108) passes through the formwork from the outer side into the contour formed by the formwork.

Each reinforcement bar (108) passes through at least one hole in the outer layer of the formwork, while the inner formwork layer is pierced by the reinforcement bar, creating an opening corresponding to the thickness of the reinforcement rod.

In some embodiments, at least one reinforcement bar (108) may be threaded through an opening in the bracket in addition to passing through the formwork. In such case the brackets (106) provide dedicated slots or fastening points for reinforcement bars (108). This enables pre-positioning of reinforcement bars within the wave-shaped mesh layers, ensuring proper alignment before concrete placement; secure attachment of reinforcement to the base, preventing displacement during vibration or curing; integration of pre-stressed reinforcement, where necessary, by utilizing the brackets as anchor points. These enhancements improve load distribution and mechanical strength, reducing stress concentration points and preventing structural weaknesses caused by misaligned reinforcement.

Due to the flexibility of the inner formwork layer, the torn edges of the opening press against the surface of the reinforcement bar, preventing the concrete mixture from spreading beyond the formwork at the penetration point after pouring.

Reinforcement bars (108) are positioned so that a portion extends beyond the formwork, while another portion remains inside the enclosed space formed by the formwork.

In some embodiments, at least one reinforcement bar is positioned so that its section inside the formwork is in close proximity to at least one other reinforcement bar within the formwork enclosure. In some embodiments, all reinforcement bars (108) are positioned in this manner.

In some embodiments, the portion of the reinforcement bar inside the formwork enclosure is secured to at least one other reinforcement bar placed inside the formwork. This connection can be established using any known method, such as: welding, wire ties, metal clamps, plastic zip ties, composite straps, specialized rebar clips or other. The choice of connection method depends on the strength and durability requirements of the structure.

Securing the reinforcement bars (108) to the internal reinforcement ensures stability before concrete pouring and hardening. Once the concrete layer has hardened, all reinforcement elements within the structure will be permanently fixed by the concrete matrix.

Step 005: Filling the Space on the Base Surface, Enclosed by the Formwork, with Concrete Mixture The internal space of the base, enclosed by the formwork, is filled with a concrete mixture. The pouring process is carried out using known tools and equipment. The pouring process can be carried out manually or with automated pumping systems, depending on project scale and required precision. Vibration compaction may be applied to ensure even material distribution.

It is preferable to calculate the amount of concrete so that the concrete level after pouring aligns with the top of the formwork, preventing overflow.

The concrete mixture can be selected with any parameters depending on the requirements of the finished product.

The concrete mixture may include additives, such as adhesion enhancers, setting accelerators, viscosity enhancers, and others.

Vibrational loading is used during pouring to remove air bubbles and ensure uniform distribution of the mixture. Vibration can be applied using immersion vibrators, which are directly inserted into the concrete mixture, or surface vibrators that act on the edges of the base. Additionally, vibrating platforms may be used to provide uniform oscillations throughout the entire structure.

After pouring, the building component is left to dry until it reaches the required strength. Due to the use of a concrete pouring method, the surface of the slab remains smooth after drying and does not require additional finishing. Preferably, drying is conducted until the concrete achieves at least 70% of its design strength. The concrete mixture reaches approximately 70% of its design strength within 7 days under normal curing conditions (t≈20° C., humidity 95%). At this stage, its moisture content is still relatively high, but its mechanical strength is sufficient to allow the slabs to be moved.

The drying process ensures the final formation of the concrete structure and its mechanical properties.

If necessary, additives and hardening accelerators may be used to speed up the process.

In some embodiments, the optimal concrete mixture consistency for filling the space formed by the formwork corresponds to a slump range of 50-150 mm according to the Abrams cone test (Slump Test), with the possibility of increasing it to 200 mm in certain cases, such as when using self-compacting mixtures.

It is preferable to use a concrete mixture with a flowability level that prevents leakage through the fine-mesh inner layer of the formwork. For example, a concrete mixture with a slump value (measured by the Abrams cone test) in the range of 50-120 cm. This range better ensures sufficient workability for placement and vibration compaction while preventing leakage through the fine-mesh inner layer of the formwork.

In some embodiments, viscosity-enhancing additives such as modified polymers or microsilica may be incorporated. These additives improve particle cohesion and further prevent leakage through the fine-mesh inner layer of the formwork.

Plasticizers may also be added to enhance workability, reduce the water-cement ratio, increase strength and durability of the final structure.

A composite building component can be manufactured using the described method.

The structure of the building component produced using the proposed method includes at least: a base made of a wooden, metal or composite building component, with a waterproofing layer applied to it; a formwork, consisting of wave-shaped segments, wherein each formwork segment has at least three mesh layers, with the mesh openings in the outer layers being larger than the mesh openings in the inner layer; reinforcement; reinforcement bars (108) passing through the formwork and positioned so that a portion of at least one reinforcement bar extends beyond the concrete layer of the composite building component, while another portion is integrated within the concrete layer.

The proposed building component is constructed using the wave-shaped mesh formwork system, reinforcement elements, and a concrete layer applied over a base. The building component incorporates all possible embodiments described in the methods of its creation, ensuring that each variant benefits from the structural, material, and automation advantages provided by the invention.

In some embodiments, the building component may be manufactured using any of the proposed methods, including: wave-shaped formwork with different amplitude and wavelength configurations, ensuring optimal load distribution, reinforcement bonding, and concrete adhesion; various reinforcement integration techniques, such as reinforcement bars passing through the formwork, multi-layered reinforcement placement, or pre-stressed reinforcement systems, depending on structural requirements; different attachment methods, utilizing brackets (106), support elements (102), clamping brackets (103), and fasteners (104), which enhance the structural stability, manufacturing precision, and compatibility with automated assembly lines; automated or manual construction processes, where the formwork, reinforcement, and concrete layer may be installed using robotic placement systems or conventional prefabrication techniques, allowing adaptability across industrial-scale manufacturing and on-site construction.

Because the building component inherits all embodiments of the proposed manufacturing methods, it also benefits from their functional advantages, including: enhanced reinforcement stability, ensuring long-term structural durability and resistance to stress loads; optimized concrete flow and curing, preventing material waste and ensuring uniform distribution; elimination of removable formwork, reducing construction time and labor costs; adaptability for complex geometries, allowing for curved, decorative, or structurally reinforced elements to be seamlessly integrated into modular and prefabricated designs.

The integration of permanent formwork not only eliminates the need for removal but can also enhance thermal insulation, and contribute to overall energy efficiency in buildings.

In some embodiments, the reinforcement may be arranged in one or multiple layers, connected to each other using wire, plastic straps, metal clamps, or welding.

In some embodiments, the reinforcement may be attached to the base using at least one clamping bracket and at least one fastener.

In some embodiments, the reinforcement rests on at least one support element. A single support element may be used for one reinforcement rod, or multiple support elements may support a single reinforcement structure. If the reinforcement rods intersect, it is preferable to position the support element at the intersection points.

In some embodiments, the concrete layer may include additives to enhance its strength, resistance to external influences, and adhesion to the base.

In some embodiments, the building components may have various geometric shapes, including rectangular, circular, or custom-shaped elements, as well as openings for communication channels or fastening systems.

In some embodiments, the building component may be additionally coated with protective layers that improve its operational properties, such as hydrophobic or fire-resistant coatings.

In some embodiments, a heating or cooling system may be integrated into the concrete layer to create building components with climate control functions.

In some embodiments, channels or openings may be embedded in the concrete layer for housing utility systems such as cables, ventilation ducts, or water supply lines.

The proposed invention enables the production of building components of any shape, including round or irregular shapes with internal openings of any configuration. The described formwork formation method allows for the creation of even the most complex geometric elements.

The proposed wave-shaped mesh formwork system is designed for seamless integration into automated manufacturing, enhancing efficiency, precision, and scalability. CNC-controlled bending machines shape and cut the mesh layers, while robotic welding assembles multi-layer configurations, reducing labor costs and ensuring consistency. Automated systems precisely thread reinforcement bars through pre-defined openings, optimizing structural integrity.

The system enables high-speed production in prefabrication and modular construction. Automated mesh welding lines eliminate manual fastening, while robotic positioning ensures accurate formwork geometry. Pre-stressed reinforcement can be integrated to enhance load-bearing capacity. The formwork allows automated concrete extrusion, ensuring uniform material distribution and vibrational curing, improving durability and reducing defects.

This automation eliminates manual formwork removal, accelerating production and lowering costs. Robotic placement of mesh and reinforcement ensures precision, while automated pouring and compaction enhance structural integrity. The system supports prefabricated modular buildings, high-rise infrastructure, and curved architectural elements, reducing material waste while maintaining high strength.

By eliminating labor-intensive steps and enabling mass production, the wave-mesh formwork system provides a scalable, cost-effective solution for modern automated construction, ensuring high-quality, structurally optimized composite building components.

The proposed invention not only reduces the time required to manufacture concrete-layered building components but also enables the full automation of the production process for building components of any shape. This is achieved by eliminating the need to dismantle removable formwork. Time and resource savings are also ensured by integrating the formwork as part of the structure, eliminating the need for its removal.

The durability and strength of the final product are ensured by the multilayer construction, consisting of sequentially applied reinforcement and concrete layers. The proposed building component is suitable for use as a wall panel, facade panel, floor panel, or decorative element, due to the permanent integration of the formwork with the base.

Ease of transportation is achieved by the ability to supply components in a disassembled state, followed by formwork formation and concrete pouring at the installation site.

Scalability is facilitated by the flexibility of the concrete layer application technology and the adaptability of the formwork to any dimensions.

The proposed method allows for the creation of both straight and curved elements, including wave-shaped and rounded forms. The use of flexible mesh formwork enables the assembly of structures with geometries close to freeform without the need for cutting or complex fitting.

The method allows the use of cost-effective materials, including steel, composite mesh, and plastic. The lightweight nature of the mesh formwork simplifies manufacturing, transportation, and assembly.

The terms and definitions used in this application are provided solely for the purpose of describing the invention and facilitating its understanding. They should not be interpreted in a manner that limits the scope of the claims or restricts the applicant's rights.

The embodiments and examples disclosed in this application are illustrative and non-limiting. Variations, modifications, and equivalents that fall within the spirit and scope of the invention, as defined by the appended claims, are intended to be encompassed therein.

The use of singular terms, such as "a," "an," and "the," should also be interpreted to include plural forms unless explicitly stated otherwise. Similarly, the use of specific terms should not be construed as excluding equivalents that serve the same function or achieve the same result.

The scope of the invention is defined by the claims, and the description should not be used to limit the interpretation of these claims.

The invention claimed is:

1. A method for manufacturing a building component, comprising:
- applying at least one layer of waterproofing material to a base comprising a wooden, metal, plastic, or composite panel, wherein the base constitutes a permanent structural layer of the building component;
- installing a permanent formwork on the base,
  - wherein the formwork is made of wave-shaped segments arranged to form a closed contour with overlapping edges defining an internal space;
  - wherein each formwork segment comprises a composite wall structure formed of at least three superimposed mesh layers, including two outer mesh layers and an inner mesh layer positioned between and in contact with the outer mesh layers, wherein mesh openings in the outer mesh layers are sized to be at least twice the size of the mesh openings of the inner mesh layer;
- placing a reinforcement into the formwork;
- threading at least one reinforcement bar through the formwork,
  - wherein the reinforcement bar passes through an opening in at least one outer layer of the formwork with openings larger than a diameter of the threaded reinforcement bar and pierces the inner mesh layer to form a friction fit aperture;
- pouring a concrete mixture into the internal space enclosed by the formwork;
- and curing the concrete mixture until the building component could be moved.

2. The method of claim 1, wherein at least a portion of the reinforcement is placed on a support element and the support element is mechanically fastened to the base.

3. The method of claim 1, wherein the reinforcement is placed above the base in at least two layers.

4. The method of claim 1, wherein the formwork segments are attached to the base using brackets having preformed fixing holes by means of at least one fastener through at least one hole in the brackets.

5. The method of claim 1, wherein the wave-shaped formwork has an amplitude in the range of 5-200 mm and a wavelength in the range of 30-300 mm.

6. The method of claim 1, wherein the mesh openings in the outer layers of the formwork through which the reinforcement bar is threaded are larger than a diameter of the reinforcement bar to allow passage without cutting the outer mesh.

7. The method of claim 1, wherein the formwork and reinforcement are positioned by robotic equipment.

8. A method for manufacturing a building component, comprising:

applying at least one layer of waterproofing material to a base comprising a wooden, metal, plastic, or composite panel, wherein the base constitutes a permanent structural layer of the building component;

installing a permanent formwork on the base, wherein the formwork is made of wave-shaped segments arranged to form a closed contour with overlapping edges defining an internal space, and each formwork segment comprises at least three mesh layers, including two outer mesh layers and an inner mesh layer positioned between the outer mesh layers, wherein mesh openings in the outer mesh layers ae sized to be at least twice the size of the mesh openings of the inner mesh layer;

placing a reinforcement into the formwork, wherein the reinforcement is placed on at least one support element and attached to the base by fixing at least one clamping bracket over the reinforcement, wherein the clamping bracket is secured to the base using at least one mechanical fastener passing through a hole in the clamping bracket;

wherein the clamping bracket is a separate part from the support element and from the reinforcement, and is secured to the base by a screw, anchor, or bolt;

wherein at least a portion of an outer mesh layer is left exposed along an external side surface of the building component, the exposed outer mesh layer providing a mechanical interlock for a cementitious joint material when the building component is positioned adjacent to another building component;

threading at least one reinforcement bar through the formwork, wherein the reinforcement bar passes through an opening in at least one outer layer of the formwork with openings larger than a diameter of the threaded reinforcement bar, pierces the inner mesh layer and is attached to the reinforcement inside the space enclosed by the formwork;

pouring a concrete mixture into the internal space enclosed by the formwork;

and curing the concrete mixture until the building component could be moved.

9. The method of claim 8, wherein the support element is mechanically fastened to the base.

10. The method of claim 8, wherein the reinforcement is placed above the base in at least two layers.

11. The method of claim 8, wherein the wave-shaped formwork has an amplitude in the range of 5-200 mm and a wavelength in the range of 30-300 mm.

12. The method of claim 8, wherein the formwork and reinforcement are positioned by robotic equipment.

13. The method of claim 8, wherein the mechanical fastener also passes through a hole of the support element to secure the support element to the base.

* * * * *